Sept. 19, 1967  C. C. INGALLS  3,341,877
TROMMEL-TYPE PRODUCE CLEANING MACHINE
Filed Oct. 18, 1965  4 Sheets—Sheet 3

United States Patent Office 3,341,877
Patented Sept. 19, 1967

3,341,877
TROMMEL-TYPE PRODUCE CLEANING
MACHINE
Charles C. Ingalls, 3042 Washington Road,
Ceres, Calif. 95307
Filed Oct. 18, 1965, Ser. No. 497,261
7 Claims. (Cl. 15—3.11)

This invention relates in general to a trommel-type produce cleaning machine and which is a modification of the machine illustrated in United States Patent No. 3,132,365.

While especially designed for use as a pre-cleaner for walnuts before hulling of the same, the machine can be readily adapted to other cleaning or separating functions, and for use with other kinds of nuts and in fact with certain kinds of fruit.

It is the major object of the present invention to provide a trommel-type produce cleaning machine characterized by a novel and extremely effective separator unit included in part in the trommel and adapted to receive and discharge the nuts free and clear of any dirt or debris with which the nuts were intermingled when fed into the machine.

An additional important object of this invention is to provide a separator unit, as in the preceding paragraph, which is operative to gravitationally trap the nuts adjacent the bottom of the trommel and to then carry them upwardly for discharge from one side of said trommel at an elevated point, while the dirt and debris is otherwise delivered from said trommel.

Another important object of the invention is to provide—in a trommel-type produce cleaning machine—a separator unit, for the purpose described, comprising a circumferential row of longitudinally extending pockets formed with and initially opening from the inside to the outside of the trommel in a circumferential section thereof; such pockets being temporarily closed—from the outside of the trommel and for a distance extending from the bottom thereof part way up the rising side of the trommel—by one run of an endless flexible belt which closely engages and travels with the outside of the trommel for such distance. It is in these temporarily closed pockets that the nuts are gravitationally trapped and thence carried upwardly to said elevated point, and at which point the nuts discharge from the pockets upon reopening thereof as said run of the belt turns away from the trommel. The arrangement is such that the nuts automatically discharge from the pockets upon reopening thereof.

It is also an object of the invention to provide a trommel-type produce cleaning machine, as above, which includes novel means to cause return to the pocketed section of the trommel any of the nuts which may pass over such section without being trapped, and which nuts would otherwise deliver from the discharge end of the trommel along with dirt and debris entrained in the air blast flowing through such trommel.

A further object of the invention is to provide a trommel-type produce cleaning machine which is designed for ease and economy of manufacture, and convenience of use.

A still further object of the invention is to provide a practical, reliable, and durable trommel-type produce cleaning machine and one which is exceedingly effective for the purpose for which it is designed.

These objects are accomplished by means of such structure and relative arrangement of parts as will fully appear by a perusal of the following specification and claims.

Figure 1:
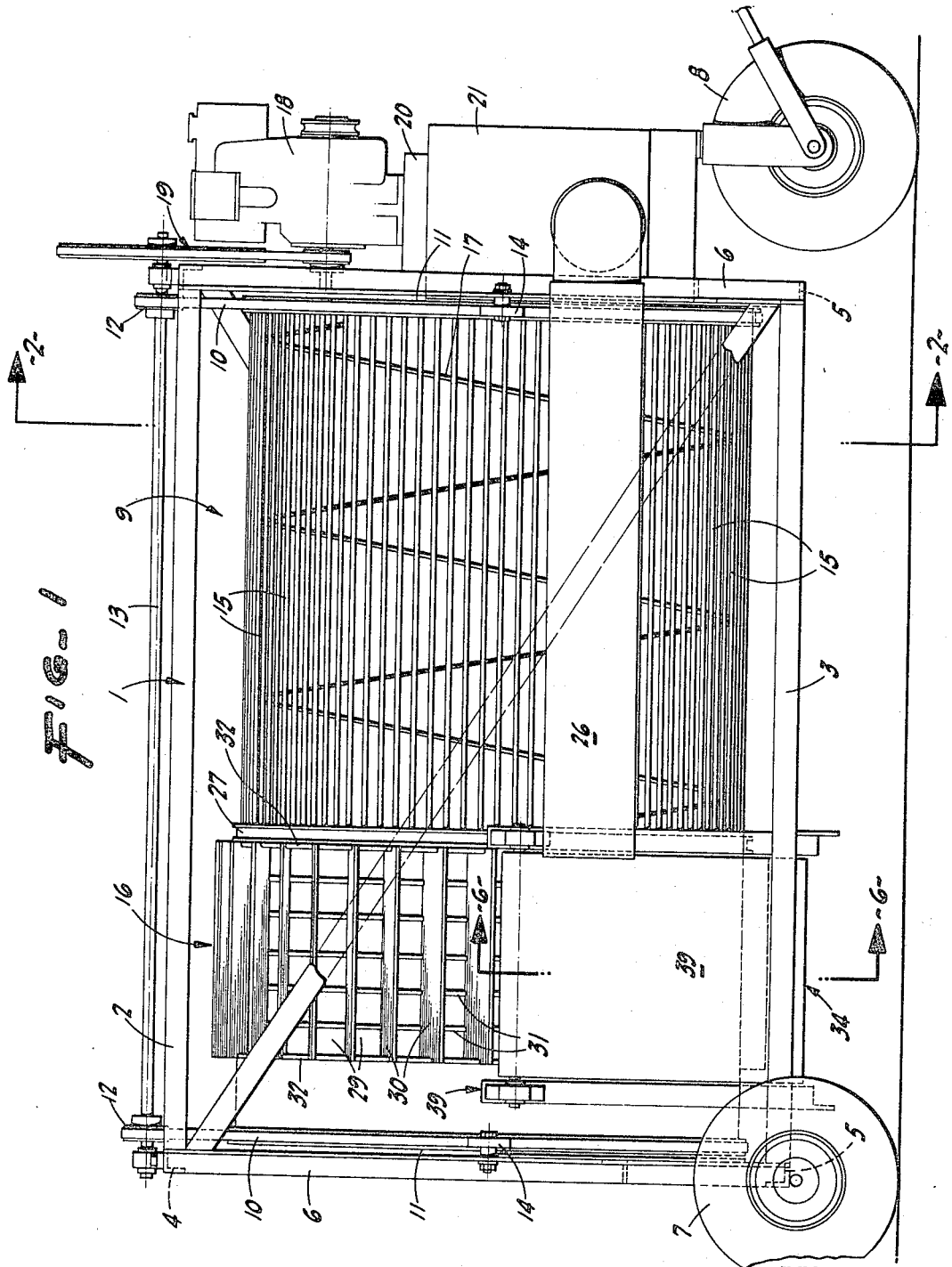
FIG. 1 is a side elevation of the machine as embodying the present invention.
Figure 2:
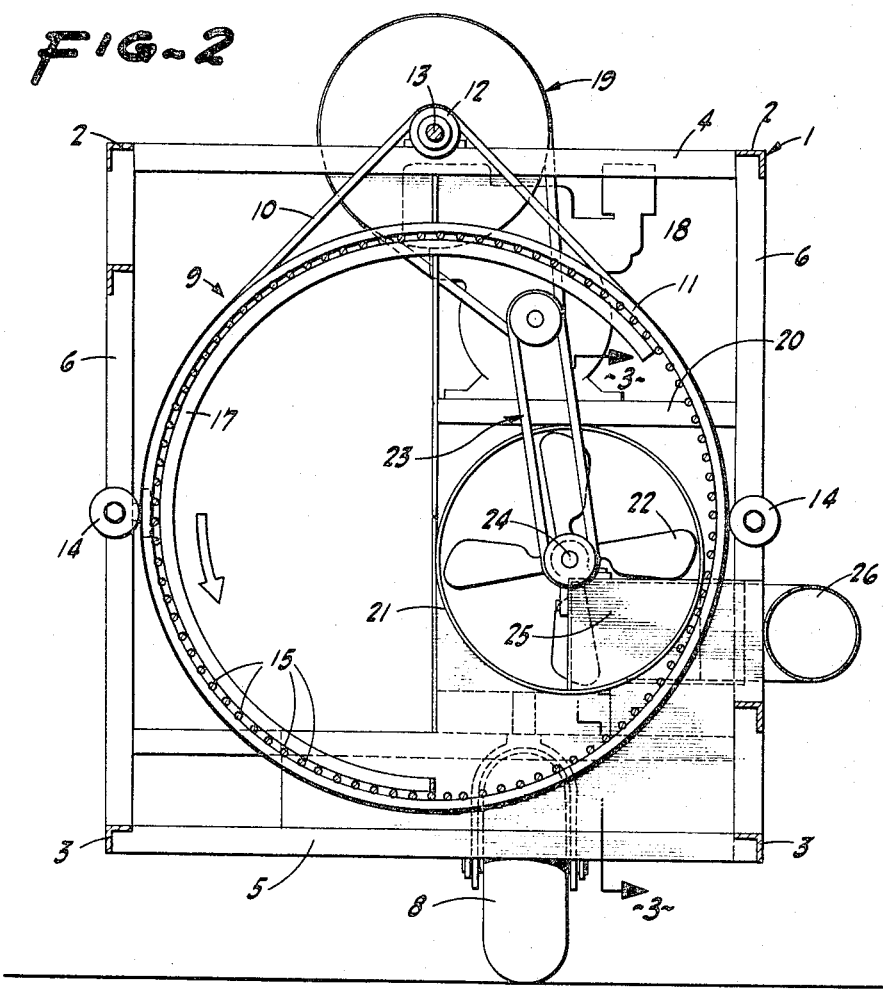
FIG. 2 is a transverse sectional elevation of the machine; the view being taken on line 2—2 of FIG. 1.
Figure 3:
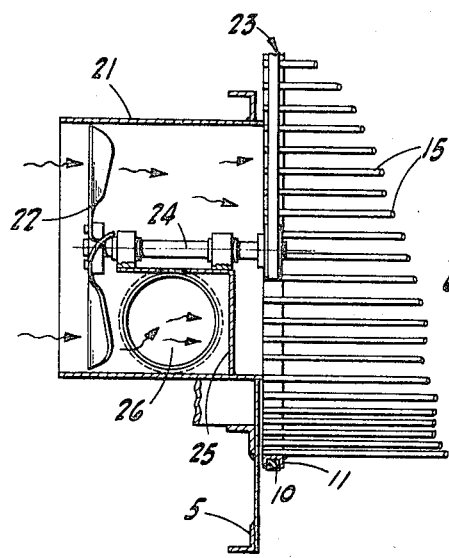
FIG. 3 is a fragmentary, longitudinal sectional elevation showing mainly the air blast-creating fan and its mounting; the view being taken on line 3—3 of FIG. 2.
Figure 4:
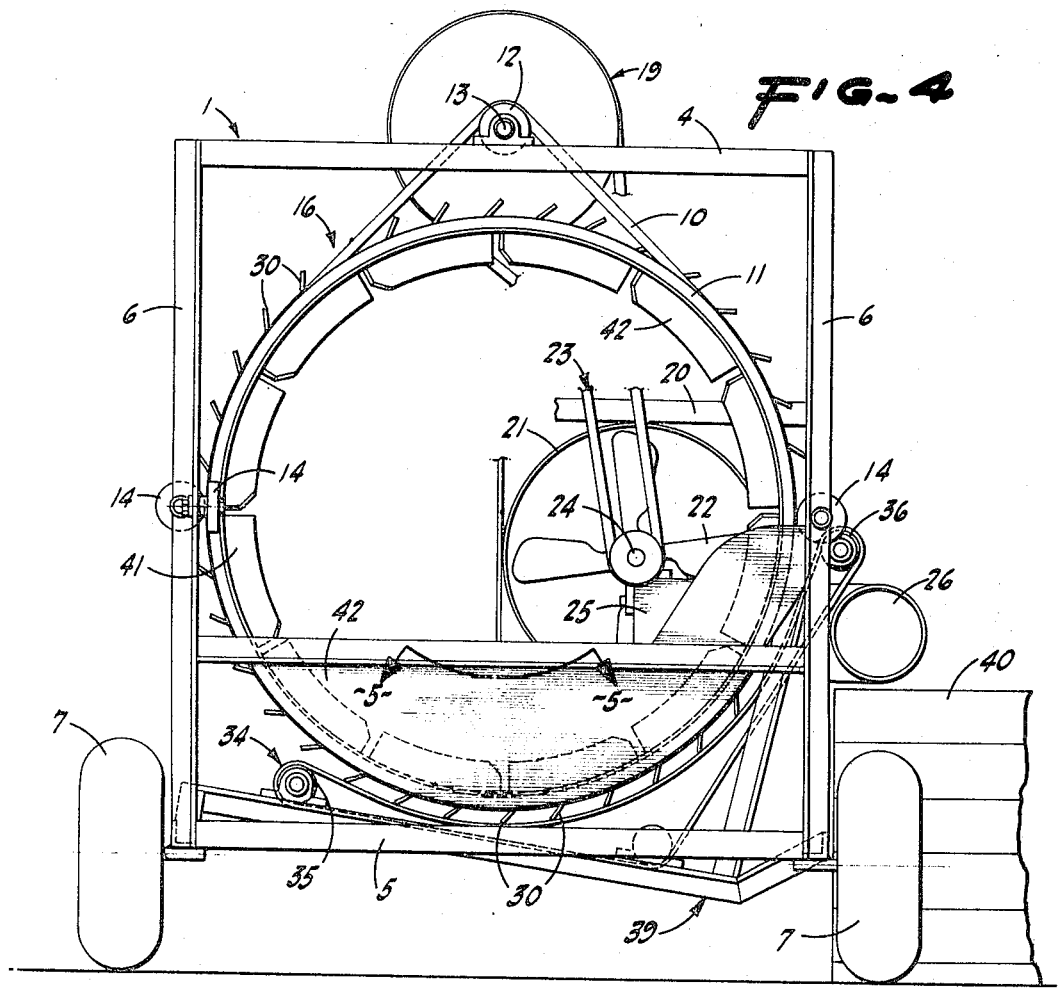
FIG. 4 is a rear end elevation of the machine.
Figure 5:
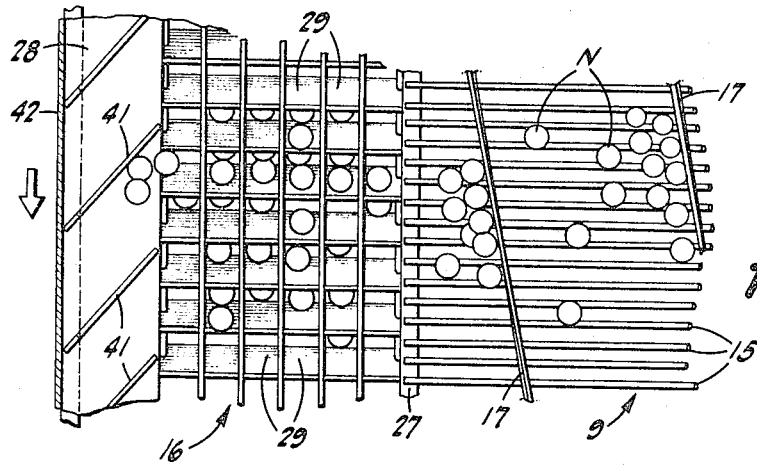
FIG. 5 is a fragmentary plan view of the pocketed section of the separator unit and adjacent parts; the view being substantially as indicated by line 5—5 of FIG. 4.
Figure 6:
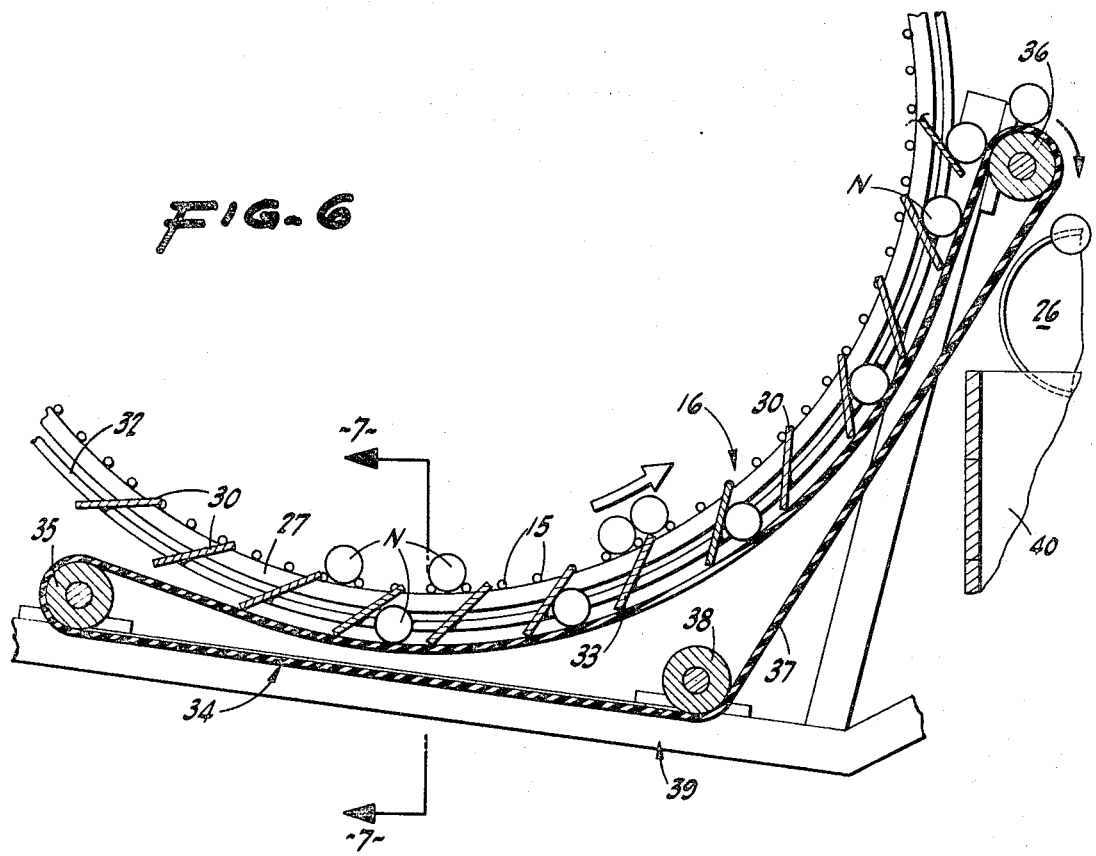
FIG. 6 is an enlarged fragmentary sectional elevation of the separator unit; the view being taken substantially on line 6—6 of FIG. 1.
Figure 7:
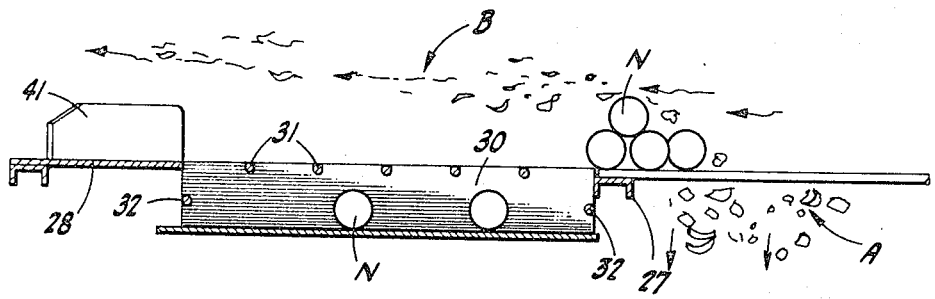
FIG. 7 is a fragmentary sectional elevation transversely through the separator unit; the view being taken substantially on line 7—7 of FIG. 6.

Referring now more particularly to the drawings and to the characters of reference marked thereon, the machine comprises a rigid open frame indicated generally at 1; such frame including longitudinal top rails 2, longitudinal bottom rails 3, top cross rails 4, bottom cross rails 5, and corner posts 6.

If it is desired that the machine be portable, it is then provided (in supporting relation to the frame 1) with transversely spaced rear wheels 7 and a steerably mounted front wheel 8.

A generally squirrel cage-type rotary trommel, indicated generally at 9, is suspended within the confines of frame 1 by means of endless belts 10 which are received in trommel-supporting relation in pulley-forming channel rings 11 at the ends of said trommel. Above the trommel, the belts 10 depend from and are driven by small pulleys 12 carried on a horizontal, longitudinally extending drive shaft 13 journaled in connection with and spanning between the top cross rails 4 centrally of the sides of the frame 1.

While supported and driven by the endless belts 10, the trommel is suitably guided against swaying by frame-mounted guide rollers 14.

From the front end thereof and extending rearwardly a substantial distance, the trommel is of open squirrel cage form and includes a multiplicity of longitudinally extending, circumferentially spaced rods 15.

Rearwardly of the squirrel cage portion of the trommel, the machine includes—in part with said trommel—a separator unit, indicated generally at 16, and which will hereinafter be described in detail. Within the squirrel cage portion thereof, the trommel 9 is fitted with a back-feeding spiral rib 17.

The shaft 13 is driven from an engine 18 through the medium of a speed reducing, endless belt and pulley assembly 19; such engine being mounted on a suitable platform 20.

For the purpose of inducing an air blast through the trommel 9 from the front to the rear end thereof, the machine is provided at its front end with a frame-supported cylindrical shroud 21 secured in a laterally offset position adjacent the upturning side of the trommel; such shroud enclosing a multi-blade fan 22 driven from the engine 18 by an endless belt and pulley assembly 23.

The multi-blade fan 22 includes a short longitudinal shaft 24 journaled atop an air catch box or transition 25 which occupies the lower and outer quadrant of the shroud 21. Such box 25 not only provides a mounting base for the shaft 24, but also serves to divert a portion of the air blast to an exterior tube 26 which extends rearwardly and horizontally along the outside of the frame 1 adjacent the upturning side of the trommel 9. Such tube 26 terminates at its rear end in substantially the transverse plane of the rear end of the squirrel cage portion of the trommel 9, and which end of the latter is defined by a ring 27.

The separator unit 16 serves the purpose, as will hereinafter more fully appear, of receiving and subsequently discharging the nuts from the trommel essentially free and clear of the dirt and debris with which the nuts were initially intermingled when fed to the machine; such separator unit comprising the following:

Between the ring 27 at the rear end of the squirrel cage portion of the trommel and a flat annular band 28 which forms the rear end portion thereof, a circumferential section of longitudinally extending pockets 29 are formed in a continuous row.

The pockets 29, which are initially open both to the inside and outside of the trommel, are defined by a multiplicity of circumferentially spaced plates 30 facing in the direction of travel of the trommel and secured at the related ends to ring 27 and band 28. Such plates are positioned so that their inner edges lie substantially ahead of their outer edges whereby upon reaching substantially the mid-point on the upturning side of the trommel, said plates incline outwardly and downwardly.

In order to form a grid through which the nuts may gravitationally fall into the pockets 29, a plurality of circumferential rods 31 connect between such blades at their inner edges. Other circumferential rods 32 at the ends of the pockets 29 prevent escape—from such ends—of nuts received in the pockets.

From the bottom of the trommel to substantially the mid-point of the upturning side thereof, the pocketed section of such trommel is engaged on the outside by the upper run 33 of a flexible endless belt, indicated generally at 34, trained over a lower end drum 35 and an upper end drum 36. Additionally, the lower run 37 of the belt is trained about an intermediate drum 38. The drum 35, 36, and 38 are journaled in connection with a sub-frame or supporting structure, indicated generally at 39, and which is a unitary part of the main frame 1.

With rotation of the trommel, the flexible endless belt 34 is likewise caused to rotate; this by reason of the close and matching engagement of the upper run 33 with the pocketed section of the trommel in the manner and to the extent described.

From the foregoing, it will be realized that the upper run 33 of the belt 34 provides an outside closure for the pockets 29 between the bottom of the trommel and a point substantially midway on the upturning side of said trommel; the pockets being reopened on the outside upon said upper run 33 turning over the upper end drum 36.

In operation of the described trommel-type produce cleaning machine, the nuts N—together with intermingled dirt and debris—are initially fed into the rotating trommel 9 at the front end and thence travel rearwardly in the squirrel cage portion of said trommel. As the nuts and intermingled dirt and debris feed slowly rearwardly in such squirrel cage portion of the trommel (which feed is slowed by the spiral rib 17), an initial cleaning results, by reason of the escape of dirt, small rocks, and other like debris, as at A, between the rods 15. At the same time, the air blast—induced through the trommel by the multi-blade fan 22—blows substantially all of the lighter and remaining dirt and debris, as at B, directly through the trommel and out of its rear end.

Thus, by the time the nuts reach the rear end of the squirrel cage portion of the trommel, they are substantially free of dirt and debris and thence pass to the separator unit 16 whereupon such nuts (essentially at the bottom and at the start of the upturning side of the trommel) gravitate into the pockets 29; being then retained therein by virtue of the outside closure of such pockets by the upper run 33 of the belt 34.

The pocketed nuts then travel upwardly in the pockets—as closed from the outside—to the relatively elevated point at which said upper run 33 turns over the upper end drum 36. Consequently, the pockets successively reopen at such point and the pocketed nuts thence deliver gravitationally out of the pockets and over said drum 36 for reception in a suitable receiver (or carry-off conveyor) indicated generally at 40.

Between the drum 36 and receiver 40, the nuts—as gravitationally discharged from the reopened pockets—fall through the stream of air delivering from the rear or open end of the tube 26. This serves as a final cleaning operation and removes any dirt or debris which may have entered the separator unit 16 and remained with the nuts as discharged therefrom.

Should any of the nuts pass over the pocketed section of the trommel without gravitating into the pockets 29, such nuts are received on the flat band 28 and are thence returned to said pocketed section by a multiplicity of circumferentially spaced, radially inwardly projecting vanes 41 fixed on said band 28. The vanes 41 are positioned with their faces diagonal to the direction of travel and with their trailing side edges adjacent the pocketed sections. Consequently, these vanes function—as they begin to rise on the upturning side of the trommel—to feed back onto the pocketed section any nuts which previously escaped over the same. As a further assurance against any such nuts being lost out of the rear end of the trommel, the latter is provided at said end with a fixed vertical baffle 42 disposed adjacent and projecting radially inwardly relative to the outer edge of band 28; such baffle extending from the bottom of the trommel upwardly substantially the same distance as the upper run 33 of belt 34.

With the described produce cleaning machine, walnuts or the like can be effectively cleaned; the machine being capable of handling a substantial volume of nuts even though a relatively large quantity of dirt and debris is initially intermingled therewith.

From the foregoing description, it will be readily seen that there has been produced such a machine as substantially fulfills the objects of the invention, as set forth herein.

While this specification sets forth in detail the present and preferred construction of the machine, still in practice such deviations from such detail may be resorted to as do not form a departure from the spirit of the invention, as defined by the appended claims.

Having thus described the invention, the following is claimed as new and useful and upon which Letters Patent is desired:

1. In a produce cleaning machine which includes a rotary trommel, and means to induce a produce cleaning air blast through the trommel; a separator unit, adapted to receive and subsequently discharge cleaned produce from the trommel, comprising means forming a multiplicity of produce-receiving pockets in one circumferential section of the trommel, said pockets being initially open both to the inside and outside of the trommel, and means temporarily closing said pockets at the outside and for a distance extending from the bottom of the trommel upwardly to an elevated point on the upturning side thereof, the produce delivering from said pockets upon reopening thereof at such point.

2. A machine, as in claim 1, in which the temporary closing means for the pockets comprises an endless belt engaging said section of the trommel on the outside and traveling therewith for said distance.

3. A machine, as in claim 1, in which said pocket-forming means includes a plurality of circumferentially spaced plates facing in the direction of travel of the trommel, and said plates being positioned so that upon said reopening of each pocket at said elevated point, the related lowermost plate inclines downwardly and outwardly from its inner edge so that the pocketed produce gravitationally delivers from said pocket.

4. A machine, as in claim 1, including means to divert a portion of said air blast to exteriorly of the trommel and across the path of produce gravitationally delivering from said pockets upon reopening thereof.

5. In a product cleaning machine which includes a rotary trommel, and means to induce a produce-cleaning air blast through the trommel; a produce separator unit formed in part with the trommel in a section adjacent but short of one end thereof, said separator unit being adapted to receive and subsequently discharge cleaned produce from one side of the trommel, and means in the trommel between said section and end to return to said unit any produce passing over such section without being received therein.

6. A machine, as in claim 5, in which said produce return means includes a flat circumferential band comprising a part of the trommel, and a multiplicity of circumferentially spaced, radially inwardly projecting vanes fixed on the band; such vanes being disposed with their faces diagonal to the direction of travel and with their trailing side edges adjacent said section.

7. A machine, as in claim 6, including a fixed baffle adjacent and projecting radially inwardly from the edge of said band opposite said section; such baffle extending from the bottom of the trommel upwardly a distance in the direction of travel of the latter.

References Cited
UNITED STATES PATENTS

| | | | |
|---|---|---|---|
| 3,105,253 | 10/1963 | Shaw | 15—3.19 |
| 3,132,365 | 5/1964 | Ingalls | 15—3.11 |

ROBERT W. MICHELL, *Primary Examiner.*